US00RE38488E

(19) United States
(12) Reissued Patent
Yamagishi

(10) Patent Number: US RE38,488 E
(45) Date of Reissued Patent: Apr. 6, 2004

(54) OPTICAL SYSTEM INCLUDING A REFLECTING POLARIZER FOR A REAR PROJECTION PICTURE DISPLAY APPARATUS

(75) Inventor: Shigekazu Yamagishi, Takatsuki (JP)

(73) Assignee: Matsushita Electric Industrial Co., Ltd., Osaka (JP)

(21) Appl. No.: 09/757,051

(22) Filed: Jan. 9, 2001

Related U.S. Patent Documents

Reissue of:
(64) Patent No.: 5,557,343
Issued: Sep. 17, 1996
Appl. No.: 08/378,795
Filed: Jan. 26, 1995

(30) Foreign Application Priority Data

Jan. 28, 1994 (JP) ..... 6-008013

(51) Int. Cl.[7] ..... H04N 5/74
(52) U.S. Cl. ..... 348/781; 348/782; 348/756
(58) Field of Search ..... 348/781, 383, 348/782, 780, 832, 751, 739, 744, 756, 757; 359/443, 834, 457, 589, 850, 636, 40, 41, 453, 456, 455, 460, 537; 353/77, 98; H04N 5/74

(56) References Cited

U.S. PATENT DOCUMENTS 4,556,913 A * 12/1985 Van Breemen et al. ..... 348/782
4,621,293 A * 11/1986 Matis ..... 348/781
4,969,732 A * 11/1990 Wright et al. ..... 353/77
5,084,807 A * 1/1992 McKechnie et al. ..... 362/228
5,105,265 A * 4/1992 Sato et al. ..... 358/60
5,576,854 A * 11/1996 Schmidt et al. ..... 349/117

FOREIGN PATENT DOCUMENTS

| | | | |
|---|---|---|---|
| EP | 0135 216 | * | 3/1985 |
| EP | 0 333 333 | * | 9/1989 |
| JP | 4-177335 | * | 6/1992 |
| JP | 5-002216 | * | 1/1993 |
| JP | 5-203910 | * | 8/1993 |

OTHER PUBLICATIONS

European Search Report dated Nov. 28, 1995.*

* cited by examiner

*Primary Examiner*—John Miller
*Assistant Examiner*—Trang U. Tran
(74) *Attorney, Agent, or Firm*—RatnerPrestia

(57) ABSTRACT

An optical system for a rear projection picture display has reduced size while maintaining screen size. Two plane mirrors are provided along a light path between a picture display unit and a screen. The first plane mirror at a projection lens side is made of a reflecting polarizer and is located along a light path between the second plane mirror and the screen. The two plane mirrors are set in a relative angle so that the incident angle of the light traveling from the projection lens to the first plane mirror is large as compared with the incident angle of the light traveling from the second plane mirror to the first plane mirror. A polarizing plate is attached at the rear side of the screen.

6 Claims, 5 Drawing Sheets

OPTICAL SYSTEM INCLUDING A REFLECTING POLARIZER FOR A REAR PROJECTION PICTURE DISPLAY APPARATUS

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention relates to an optical system of a rear projection picture display apparatus for displaying a large picture by projecting the picture displayed on a picture display unit using a projection lens onto a screen.

(2) Description of the Prior Art

A picture display apparatus having high resolution and a large screen has been desirable for commercial uses such as High Vision and industrial uses such as high grade computer displays. With the above applications, projection type picture display apparatus are spreading throughout the market.

Projection type picture display apparatus are classified into two types. One is a two unit type which projects a picture on a screen which is separated from the projector unit. Another is a single unit type in which a projector unit and a screen are built in one enclosure. The latter is called rear projection type.

The former is considerably small, has minimal restrictions in projection distance and is free in projection size. However, if external light comes on the screen, the projected picture is accompanied by black buoying. Therefore, it is desirable to use the former in a dark room (or in a similar type of environment). The latter can display a good picture even under a bright environment because no external light from the projector side comes to the screen. However, the apparatus may require a space corresponding to the projection distance. Thus, the enclosure of the apparatus may be big. This is not desirable for home use.

To make an apparatus small size, two kinds of solutions have been considered in a rear projection type. One solution is to use a projection lens having a short focal distance in order to reduce the projection distance. Another solution is to miniaturize a projection tube, a projection lens, etc. However, after much experimentation in these areas, it is difficult to expect further progress in the future although a small improvements may be made.

One attempt to make the apparatus size small is disclosed in Japanese Patent Laid-Open 2-140792. An optical system for a rear projection picture display apparatus in accordance with the prior art is shown in FIG. 1. The apparatus includes a picture display unit (not shown in the drawing), a beam splitter 2 for partially reflecting and partially transmitting the incident light, a mirror 3 for returning the reflected light from the beam splitter 2 toward the beam splitter 2 again, a louver 4 provided at the rear surface of the beam splitter 2 so that the light in the previously designated range of the incident angle against the perpendicular line to the beam splitter 2 can transmit to the beam splitter 2, and a screen 5.

With the above-mentioned construction, space for the folded light path of the mirror is reduced.

However, because the louver 4 splits transmitting light and not-transmitting light according to its incident angle, the incident angle differs at the center and at the periphery of the screen, and brightness unevenness occurs unless a constant amount of light is transmitted for any incident angle. Further, because the louver 4 has plural light paths, the transmission factor may decrease, and a moire due to a mutual relation with a displayed picture may appear. As a result, picture quality deterioration will be induced.

SUMMARY OF THE INVENTION

To solve the above-mentioned problem, a rear projection picture display apparatus includes a picture display unit having a display device for displaying a picture corresponding to an input video signal, a projection lens for projecting and magnifying the displayed picture on the display device, a screen for projecting the picture displayed on the display device through the projection lens and two mirrors on the light path between the projection lens and the screen.

The first plane mirror of the projection lens side is made of a reflecting polarizer and provides a characteristic that transmits light oscillating in the parallel direction to the incidence plane (which is called P-polarized light) among the incident light to the first plane mirror and reflects the light oscillating in the perpendicular direction to the incidence plane (which is called S-polarized light) and fixed at the position to screen the light between a second plane mirror of the screen side and the screen to be displayed with a picture.

The first plane mirror is set so that the incident angle of the light from the projection unit to the first plane mirror is sufficiently larger than the incident angle of the light to the first plane mirror after being reflected at the second plane mirror. A polarizing plate is provided at the rear side of the screen so that the polarized light oscillating in the direction to transmit the first plane mirror is absorbed.

The S-polarized light among the light coming to the first plane mirror from the projection lens is reflected at the first plane mirror. The S-polarized light reflected at the first plane mirror is reflected at the second plane mirror toward the screen keeping its oscillation direction.

The fast plane mirror is located between the second plane mirror and the screen, but because the first plane mirror is made of a reflecting polarizer and the angle relation between the first plane mirror and the second plane mirror is set so that the incident angle of the light traveling to the first plane mirror from the picture display unit is an angle which the first plane mirror can sufficiently display its performance as a polarizer. In addition, the incident angle of the light traveling to the first plane mirror again after being reflected at the second plane mirror is an angle which the fast plane mirror can not sufficiently display its performance as a polarizer. The light reflected at the second plane mirror transmits the first plane mirror and can arrive at the screen, although the first plane mirror locates to screen the light traveling from the second plane mirror to the screen.

Therefore, the space in the enclosure which is necessary to fold the light path by the first plane mirror can be made smaller than the space of a usual rear projection picture display apparatus using surface-coated mirrors or rear surface-coated mirrors as the first and second plane mirrors and the entire apparatus size can be made small.

Picture quality deterioration is protected by providing a polarizing plate between the screen and the first plane mirror to absorb the P-polarized light oscillating in the parallel direction to the incidence plane among the light traveling to the first plane mirror from the projection lens and eliminate harmful light.

Another rear projection picture display apparatus to solve the above-mentioned problem includes a picture display unit having a display device for displaying a picture corresponding to an input video signal, a projection lens for magnifying and projecting the displayed picture on the display device, a screen for projecting the picture displayed on the display device through the projection lens and two mirrors on the light path between the projection lens and the screen.

The first plane mirror at the projection lens side is made of a reflecting polarizer and provides a characteristic that transmits the P-polarized light oscillating in the parallel direction to the incidence plane among the incident light to the first plane mirror and reflects the S-polarized light oscillating in the perpendicular direction to the incidence plane and fixed at the position to screen the light between a second plane mirror at the screen side and the screen to be displayed with a picture.

A quarter-wave plate is attached on the reflecting surface of the second plane minor so that the S-polarized light traveling to the second plane mirror is rotated by 90 degrees at the reflection at the second plane mirror and travels toward the screen as P-polarized light.

The S-polarized light among the light traveling from the projection lens to the first plane minor is reflected at the first plane minor and then, when it is reflected at the second plane mirror the oscillating direction of the S-polarized light is rotated by 90 degrees by passing through the quarter-wave plate on the second plane minor and the S-polarized light is transformed to a P-polarized light and travels toward the screen.

Because the light traveling from the second plane mirror is P-polarized light, it transmits the first plane mirror and can arrive at the screen.

Here, the first plane mirror is made of a reflecting polarizer similar to the first resolving means but no restriction is needed for a relation between the incident angle of the light traveling from the picture display unit to the first plane mirror and the incident angle of the light traveling to the first plane mirror after being reflected at the second plane minor.

According to the second resolving means, because the space in the enclosure can be made small by folding the light path by the first plane mirror, similar to the first resolving means, the entire apparatus size can be made small.

Further, a polarizing plate is positioned between the first plane mirror and the screen to absorb the P-polarized light among the incident light to the first plane mirror. Thus, harmful light can be eliminated and picture quality deterioration is prevented. Providing eliminating means of the light oscillating in a parallel direction to the first plane mirror between the picture display unit and the first plane mirror also increases design freedom.

In the first and second resolving means described above, a picture display device which the oscillating direction of the emitted light is restricted to a specified direction like a liquid christal display panel can be used as a picture display unit and it does not result in a decrease of brightness.

DETAILED DESCRIPTION OF THE INVENTION

First Exemplary Embodiment

Figure 1:
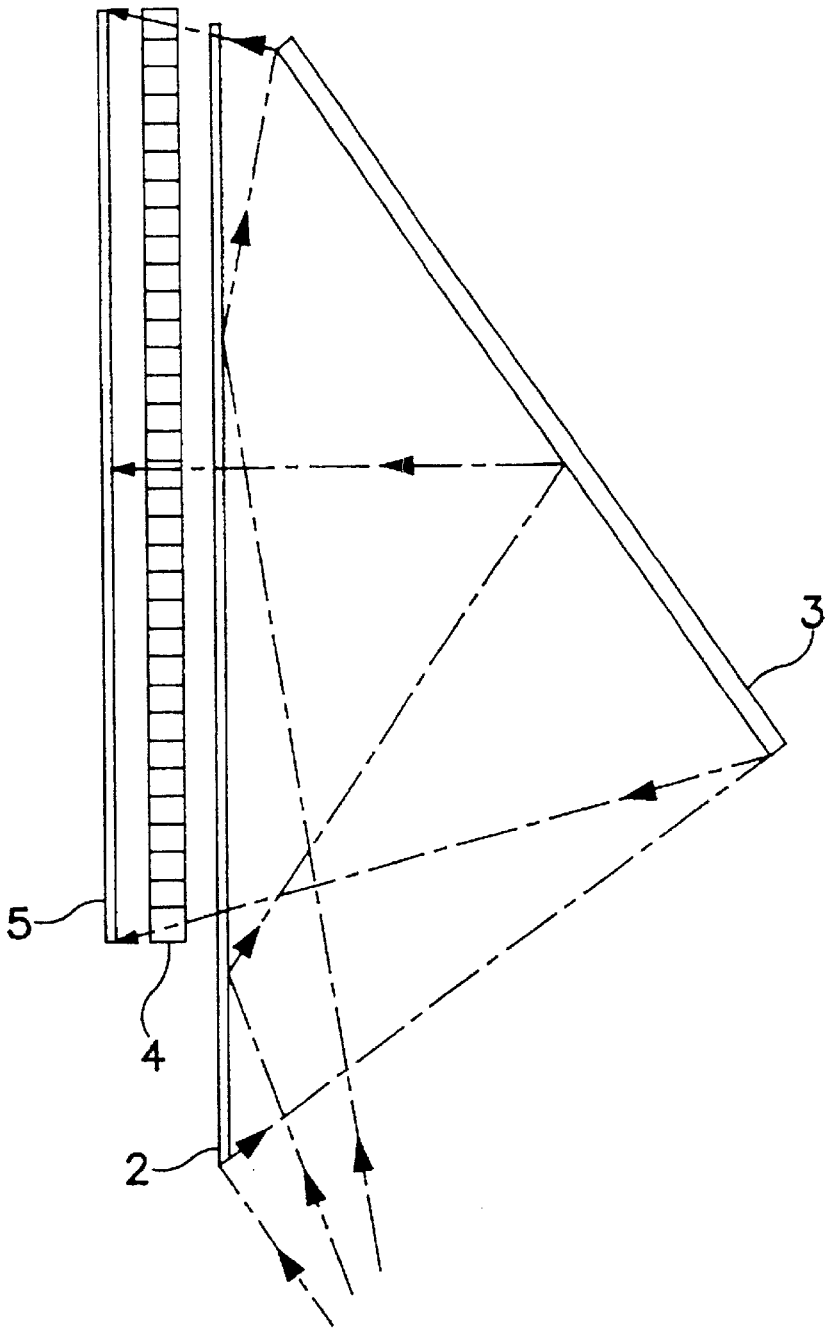
FIG. 1 (PRIOR ART)
FIG. 1 illustrates an optical system for a rear projection picture display apparatus in accordance with the prior art.
Figure 2:
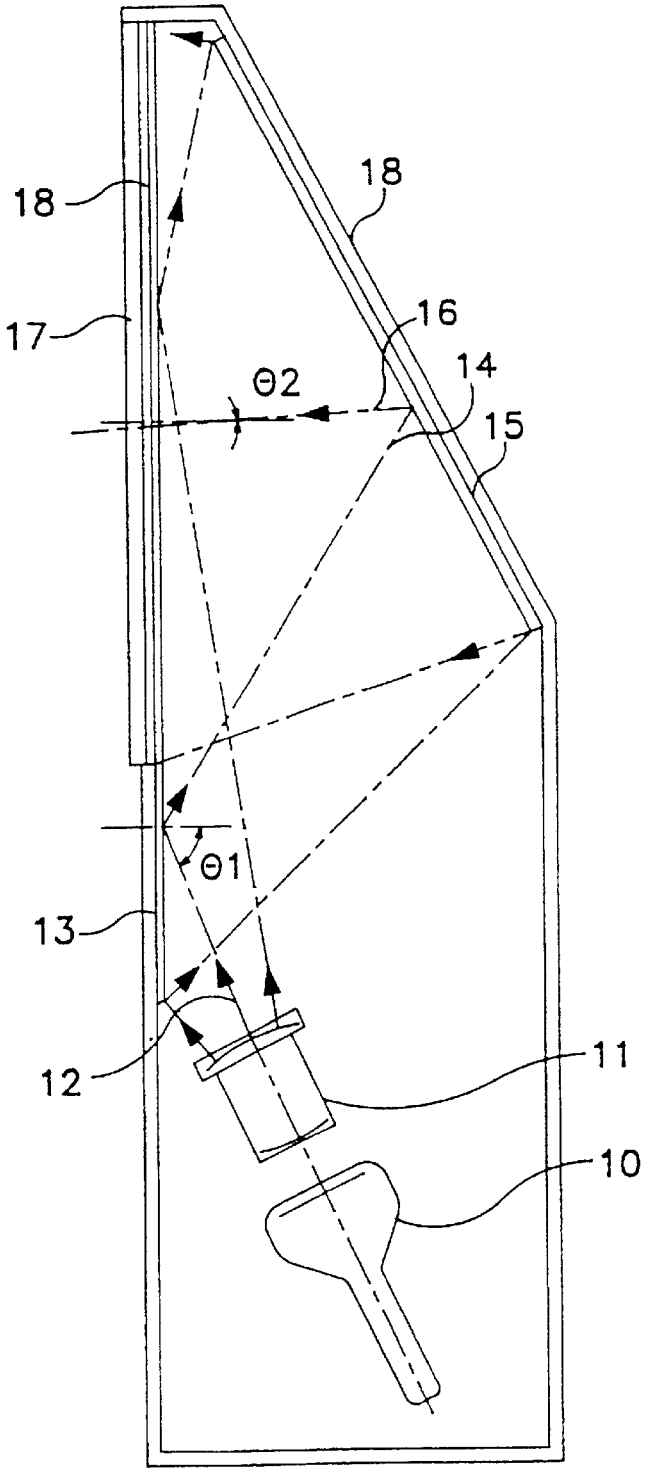
FIG. 2 illustrates an optical system for a rear projection picture display apparatus in accordance with a first exemplary embodiment of the present invention.

An optical system for a rear projection picture display apparatus in accordance with a first exemplary embodiment of the present invention is illustrated in FIG. 2.

A cathode ray tube 10 displays a picture on its faceplate coated with phosphor. A video processing circuit, deflection circuits, etc. are not shown in the drawing. A projection lens 11 is provided in front of the faceplate of the cathode ray tube 10 to project and magnify the picture on the cathode my tube faceplate to a designated size. The light transmitting the projection lens 11 travels to a first plane mirror 13 which is fixed at an angle relative to the light axis 12. The first plane mirror 13 is made of a reflective polarizer and the S-polarized light oscillating in the perpendicular direction to the incidence plane is reflected along a light axis 14. The P-polarized light oscillating in the parallel direction to the incidence plane is transmitted to the first plane mirror 13. The light reflected along the light axis 14 is reflected along the light axis 16 after traveling to a second plane mirror which is fixed at an angle relative to the light axis 14 and travels toward a screen 17. A magnified image is focused on the screen 17 by the projection lens 11. The cathode ray tube 10, the projection lens 11, the first plane mirror 13 and the second plane mirror 15 are fixed inside an enclosure 18 having the screen 17 at the opening of the enclosure 18.

Figure 3:
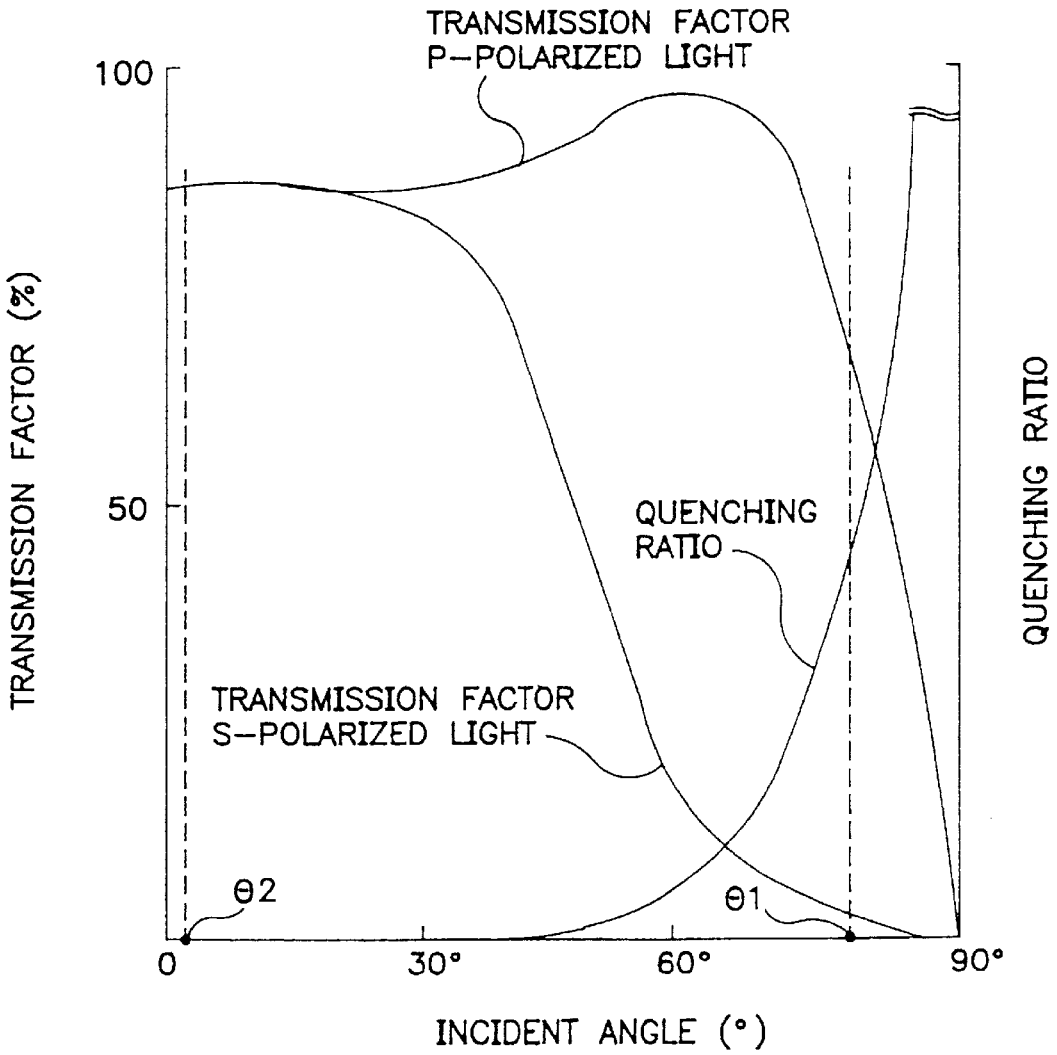
FIG. 3 shows an incident angle dependency characteristic of a reflecting polarizer used in a rear projection picture display apparatus in accordance with the first exemplary embodiment of the present invention.

An incident angle dependency characteristic of a reflecting polarizer used as a first plane mirror 13 in an optical system for a rear projection picture display apparatus, in accordance with the first exemplary embodiment of the present invention, is shown in FIG. 3.

The incident angle of the light axis 12 directly traveling to the first plane mirror 13 is defined as θ1 and the incident angle of the light axis 12 traveling to the first plane mirror 13 after being reflected at the second plane mirror 15 is defined as θ2. The incident angle θ1 is chosen to be very large, as compared to the incident angle θ2, and to have the biggest quenching ratio at the incident angle dependency characteristic of the first plane mirror (reflecting polarizer) 13 shown in FIG. 3. That is, θ1 is chosen so that the value which the transmission factor of the P-polarized light having a parallel oscillation direction to the incidence plane is divided by the transmission factor of the S-polarized light having a perpendicular oscillation direction to the incidence plane is the biggest or its near value. The angle θ2 is chosen to have a high transmission factor of the S-polarized light having a perpendicular oscillation direction to the incidence plane at the incident angle dependency characteristic of the first plane mirror 13 shown in FIG. 3. Therefore, in FIG. 2, the light reflected at the second plane mirror 15 travels toward the first plane minor 13 and transmits the first plane minor 13 and arrives at the screen 17.

The light coming from the projection lens 11, transmitted to the first plane mirror (reflecting polarizer) 13 and oscillating parallel to the incidence plane travels to the screen 17 located at the rear side of the first plane mirror 13. Because the incident angle of the light directly traveling from the projection lens 11 at the screen 17 is different from that of the light being reflected at the second plane mirror 15 at the screen 17 and is set to be big enough, the light transmitted to the screen 17 does not travel to the viewer. Therefore, it is not harmful light. Further, by providing a polarizing plate 19 at the rear side of the screen 17 (that is, between the screen 17 and the first plane mirror 13) to absorb the P-polarized light leaking through the first plane mirror 13 and to transmit the S-polarized light traveling along the light axis 16, the harmful light for the viewer can be eliminated and a good picture can be displayed. Diffuser may be painted on the surface of the screen 17 or compounded in the screen 17.

According to the exemplary embodiment of the present invention, a rear projection picture display apparatus can be made small without picture quality deterioration, because the light traveling from the projection lens reflects at the plane mirror and travels taking a zigzag course.

The upper part of first plane mirror 13 can be cut away, that is a smaller reflecting polarizer having an area to reflect the incident light from the projection lens toward the second plane mirror can be used as a first plane mirror 13. Although among the light reflected at the second plane mirror and arriving at the screen 17, for the lower part of screen 17 the light travels through the first plane mirror again. However, for the upper part of the screen 17 the light travels directly to the screen which results in slight unevenness in the picture brightness. Because a reflecting polarizer is expensive, cost reduction by using a smaller reflecting polarizer is also effective.

Second Exemplary Embodiment

Figure 4:
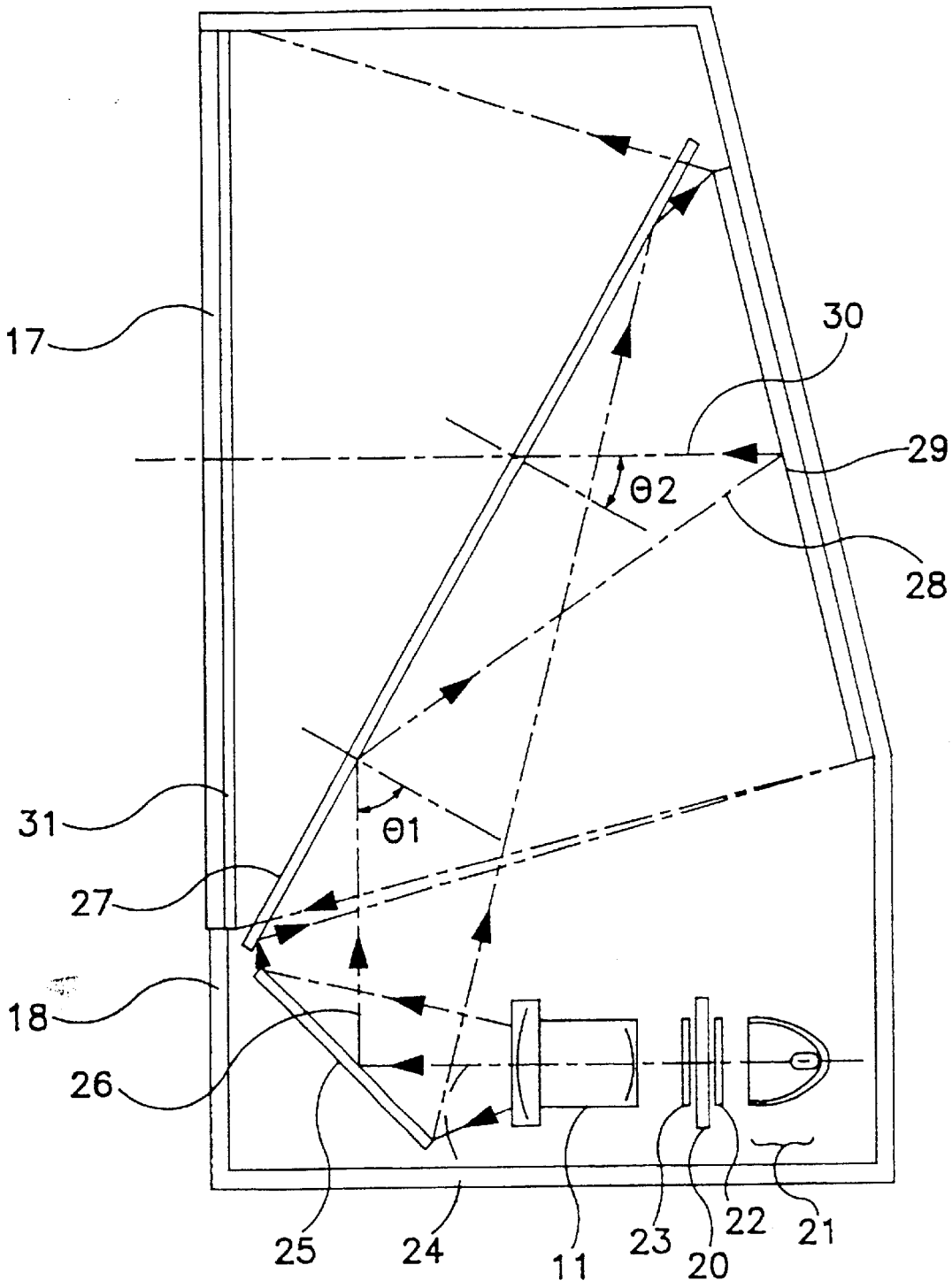
FIG. 4 illustrates an optical system for a rear projection picture display apparatus in accordance with a second exemplary embodiment of the present invention.

An optical system for a rear projection picture display apparatus in accordance with a second exemplary embodiment of the present invention is illustrated in FIG. 4. In the second exemplary embodiment, a liquid crystal display panel is used instead of a cathode ray tube as a picture display unit. The light emitted from a light source 21 and which is transmitted to a fast polarizing plate 22 provided at a light source side is restricted with its oscillation direction to one direction. The oscillation direction of the light transmitted to each element of the liquid crystal panel 20 is varied corresponding to a video signal and after transmitted to a second polarizing plate 23 provided at a projection lens side, a picture is obtained. A video processing circuit, a driving circuit, etc. are not shown in FIG. 4. A projection lens 11 provided in front of the liquid crystal panel 20 magnifies and projects the picture to a designated size on a screen 17. The light from the projection lens 11 is reflected by a third plane mirror 25 angled relative to a light axis 24 from the light axis 21 to a light axis 26 and then travels to a first plane mirror 27 angled relative to the light axis 26. The first plane mirror 27 is made of a reflecting polarizer. The S-polarized light oscillating in the perpendicular direction to the incidence plane is reflected by the first plane mirror 27 along a light axis 28. The P-polarized light oscillating in the parallel direction to the incidence plane is transmitted to the first plane mirror 27.

The S-polarized light reflected along the light axis 28 travels to a second plane mirror 29 slanting relative to the light axis 28, is reflected along the light axis 30 there, is transmitted to a screen 17 and is focused on the surface of the screen 17. Thus, a projected picture can be offered to the viewers. The components are supported in an enclosure 18 having the screen 17 at the opening of the enclosure 18. The enclosure prevents external tight from coming inside. A third polarizing plate 31 is provided behind the screen 17 to absorb the P-polarized light leaking through the second polarizing plate 23 and to transmit the S-polarized light traveling along the light axis 30, similar to the fast exemplary embodiment of the present invention.

The incident angle of the light axis 26 against the first plane mirror 27 is defined as θ1 and the incident angle of the light axis 30 against the first plane mirror 27 is defined as θ2. The relation between θ1 and θ2 is chosen similar to that in the first exemplary embodiment.

The difference from the first exemplary embodiment is in a picture display unit. In the second exemplary embodiment, the picture display unit is a liquid crystal type and the oscillating direction of the light emitted from the picture display unit is perpendicular to the first plane mirror 27 (reflecting polarizer). That is, the light transmitting through the second polarizing plate 23 may be an S-polarized light. By varying the oscillation direction (using for example, a half-wave plate between the second polarizing plate 23 and the projection lens 11 or between the projection lens 11 and the first plane mirror 27) other types of light can be used. In the second exemplary embodiment, it is possible to greatly decrease the light which travels along the light axis 26, which is transmitted to the first plane mirror 27 and becomes harmful light at the screen 17 without decreasing the picture brightness.

In the second exemplary embodiment, a transmission type is used as a liquid crystal display panel but a similar effect is, of course, obtained by using a reflecting type.

Third Exemplary Embodiment

Figure 5:
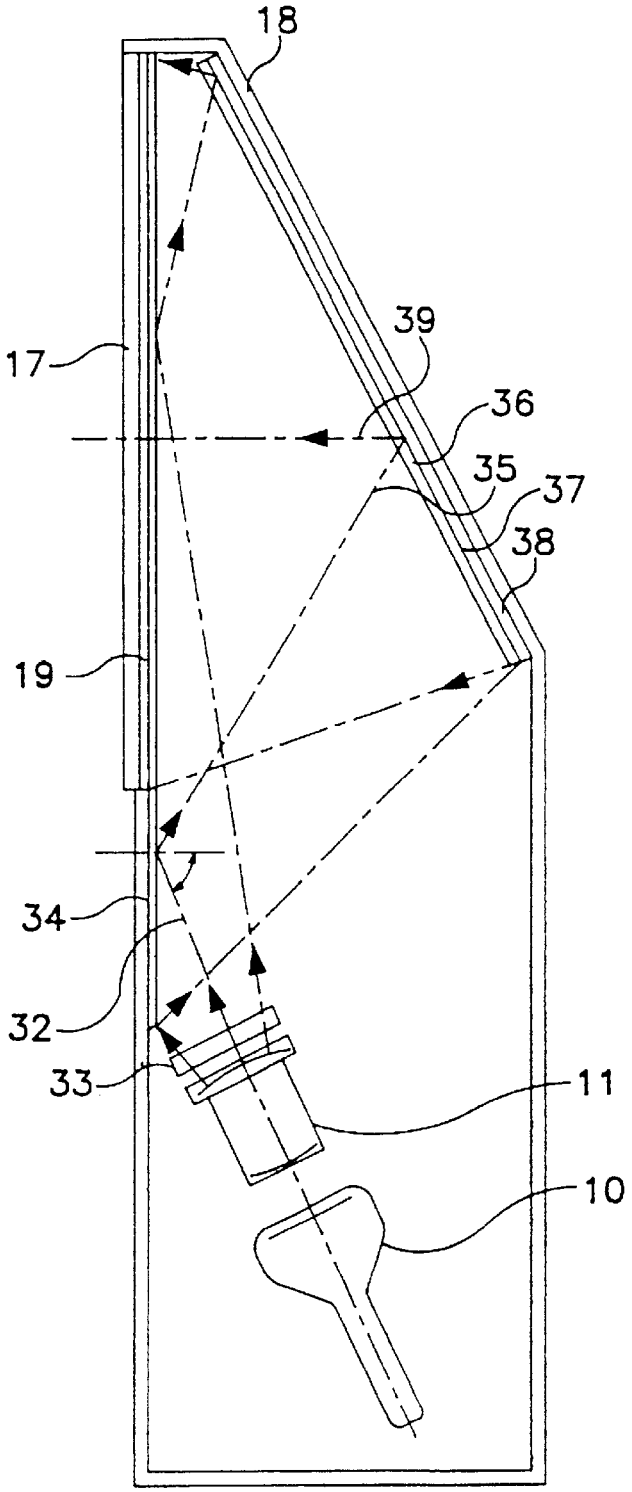
FIG. 5 illustrates an optical system for a rear projection picture display apparatus in accordance with a third exemplary embodiment of the present invention.

An optical system for a rear projection picture display apparatus in accordance with a third exemplary embodiment of the present invention is illustrated in FIG. 5.

A cathode ray tube 10 displays a picture on its faceplate coated with phosphor, corresponding to a video signal. A projection lens 11 provided in front of the cathode ray tube 10 projects and magnifies the picture to a designated size. The light transmitted from the projection lens 11 travels to a first plane mirror 34 provided slanting relative to a light axis 32 after being transmitted through polarizing direction restricting means 33 provided on the light axis 32. The first plane mirror 34 is made of a reflecting polarizer. The polarizing direction restricting means 33 is provided so that only the S-polarized light travels toward the first plane mirror 34 along the light axis 32. The S-polarized light is reflected at the first plane mirror 34 along a light axis 35. The second plane mirror 38 is fixed slanting relative to the light axis 35 and a quarter-wave plate 36 is tightly attached on the reflecting surface 37 of the second plane mirror 38. The S-polarized light reflected along the light axis 35 is transmitted to the quarter-wave plate 36, is reflected at the surface 37 of the second plane minor 38, is transmitted to the quarter-wave plate 36 again, is rotated (in oscillating direction) by 90 degrees. The S-polarized light changes to P-polarized light, travels along a light axis 39, is transmitted to the first plane minor 34 and arrives at the screen 17. The projection lens 11 focuses an image on the screen 17 and offers a picture to the viewers. An enclosure 18 provides the screen 17 at an opening of the enclosure 18, prevents external light from coming in and supports the components such as the plane mirrors 34 and 38, the polarizing direction restricting means 33, the projection lens 11, the cathode ray tube 10, the video processor, etc.

Because the light along the light axis 32 is S-polarized light, it is reflected at the first plane mirror 34. However, because the light along the light axis 39 is P-polarized light, it is transmitted to the first plane minor 34 made of a reflecting polarizer.

Therefore, according to the third exemplary embodiment of the present invention, the entire apparatus can be made small as in the first and second exemplary embodiments and further, there is no restriction in the incident angle against the first plane mirror 32 when the light travels to the first plane minor 32 again. Also, the design freedom increases as compared with the first and second exemplary embodiments.

Most of the incident light oscillating in a perpendicular direction to the incidence plane at the first plane mirror 34 is reflected as explained before. However, because the incident light is not parallel, some of the incident light could be transmitted to the first plane mirror 34 depending on a relation between the cathode ray tube 10 and the projection lens 11. The P-polarized light transmitted to the first plane mirror 34 travels to the screen 17 located at the rear side of the first plane minor 34. However, similarly to the first exemplary embodiment, the incident angle is set to be large enough as compared with the incident angle of the light along the light axis 39 which is viewed by the viewers, that the light does not travel to the viewers and is not harmful. Thus, the picture is not deteriorated.

Further, similar to the first and second exemplary embodiments of the present invention, to provide a polarizing plate between the screen 17 and the first plane mirror 34 to absorb the P-polarized light leaking through the polarizing direction restricting means 33 and transmit the P-polarized light traveling along the light axis 38 is effective for excluding harmful light for the viewer. This polarizing plate is not shown in FIG. 5. Diffuser may be painted on the surface of the screen 17 or compounded in the screen 17, also similar to the first and second exemplary embodiments of the present invention.

In the third exemplary embodiment, the polarizing direction restricting means 33 can be realized by a material to transmit only light having a certain oscillating direction and absorb light having other oscillating directions such as a polarizing plate or material to reflect only light having a certain oscillating direction and transmit light having other oscillating directions such as a reflecting polarizer.

The combination of a cathode ray tube 10 and a polarizing direction restricting means 33 can be replaced by the combination of a liquid crystal panel 20, a light source 21, a first polarizing plate 22 and a second polarizing plate 23.

A rear projection picture display apparatus in accordance with the first exemplary embodiment of the present invention includes a picture display unit for displaying a picture corresponding to a video signal, a projection lens for magnifying and projecting a picture displayed on the picture display unit, a screen for displaying a projected image on it and two plane mirrors on the light path between the projection lens and the screen. A first plane minor of the two plane mirrors located at the projection lens side and between the screen and another second plane minor is made of a reflecting polarizer and has a characteristic to transmit P-polarized light and reflect S-polarized light.

Further, the first plane minor can be oriented so that the incident angle of the light traveling from the picture display unit to the first plane minor is large compared with the incident angle of the light traveling to the first plane mirror after being reflected at the second plane mirror.

A rear projection picture display apparatus in accordance with the third exemplary embodiment of the present invention includes a picture display unit for displaying a picture corresponding to a video signal, a projection lens for magnifying and projecting a picture displayed on the picture display unit, a screen for displaying a projected image on it and two plane mirrors on the light path between the projection lens and the screen. A first plane mirror of the two plane mirrors located at the projection lens side and between the screen and a second plane mirror is made of a reflecting polarizer and has a characteristic to transmit P-polarized light and reflect S-polarized light. A quarter-wave plate can be attached on the reflecting surface of another second plane minor to rotate the polarizing direction of the incident light by 90 degrees and to emit the incident light as reflected light.

According to the above-mentioned construction, a part of the light paths coming-in and reflected at the first and second plane mirrors can be lapped over the other paths. Thus, the space in the enclosure can be made small, that is, the entire apparatus size can be made small.

In the fast exemplary embodiment, a polarizing plate is attached at the rear side of the screen to absorb the light which is transmitted to the first plane mirror. In the third exemplary embodiment, means for eliminating P-polarized light at the first plane mirror is provided between the picture display unit and the first plane minor. By this means, the application field can be spread. Further, picture quality can be improved by providing a polarizing plate to absorb the polarized light which was reflected at the first plane mirror at the rear side of the screen.

Furthermore, when the above-mentioned means is used, because the picture display unit uses a picture display device with which the oscillating direction of the emitting light is restricted to a specified direction pike a liquid crystal panel), the entire apparatus size can be made small with minimum brightness deterioration.

The invention may be embodied in other specific form without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed:

1. An optical system for a rear projection picture display apparatus comprising:

a picture display unit for generating a picture corresponding to an input video signal;

a projection lens for magnifying and projecting said picture to produce a magnified picture;

a first plane mirror positioned between a second plane minor and a screen, said first plane mirror having a plane of incidence for receiving and reflecting said magnified picture to produce a reflected magnified picture, wherein add magnified picture is comprised of P-polarized light oscillating in a direction parallel to the plane of incidence and S-polarized light oscillating in a direction perpendicular to the plane of incidence;

said second plane mirror for receiving and reflecting said reflected magnified picture to produce a further reflected magnified picture; and said screen for displaying said further reflected magnified picture, said screen including a polarizing plate for absorbing light forming said further reflected magnified picture oscillating in a parallel direction relative to said incidence plane;

wherein a first incident angle of light forming said magnified picture relative to said first plane mirror is larger than a second incident angle of light forming said further reflected magnified picture relative to said [second] *first* plane mirror and all light [transmitting] *in said further reflected magnified picture is transmitted toward* said polarizing plate *so that all of said light* is projected *on*to said screen.

2. An optical system for a rear projection picture display apparatus comprising:

a picture display unit for generating a picture corresponding to an input video signal;

a projection lens for magnifying and projecting said picture to produce a magnified picture;

a first plane mirror comprised of a reflecting polarizer for receiving and reflecting said magnified picture to produce a reflected magnified picture, said first plane mirror positioned between a second plane mirror and a screen;

said second plane minor including a quarter-wave plate on the reflecting surface of said second plane mirror for receiving and rotating the polarizing direction of light forming said reflected magnified picture; and said screen for displaying *all of* said rotated light from said reflected magnified picture.

3. An optical system for a rear projection picture display apparatus as recited in claim 2, further comprising: means located between said picture display unit and said first plane mirror for eliminating light oscillating in a parallel direction to an incidence plane of said first plane mirror.

4. An optical system for a rear projection picture display apparatus as recited in claim 2, further comprising:

a polarizing plate included with said screen for absorbing light oscillating in a perpendicular direction to the incidence plane of said first plane mirror.

5. An optical system for a rear projection picture display apparatus as recited in claim 1, wherein said picture display unit comprises a picture display device in which the oscillating direction of emitted light forming said picture is restricted to a designated direction.

6. An optical system for a rear projection picture display apparatus as recited in claim 2, wherein said picture display unit comprises a picture display device in which the oscillating direction of emitted light forming said picture is restricted to a designated direction.

* * * * *

UNITED STATES PATENT AND TRADEMARK OFFICE

CERTIFICATE OF CORRECTION

PATENT NO. : RE 38,488 E
DATED : April 6, 2004
INVENTOR(S) : Shigekazu Yamagishi It is certified that error appears in the above-identified patent and that said Letters Patent is hereby corrected as shown below:

Column 8,
Line 51, delete “minor” and add -- mirror --
Line 66, after “said” add -- reflected --

Column 9,
Line 2, delete “[second]”
Line 3, delete “[transmitting]”
Line 18, delete “minor” and insert -- mirror --

Signed and Sealed this

Twenty-first Day of September, 2004

JON W. DUDAS
*Director of the United States Patent and Trademark Office*